United States Patent
Tsai et al.

(10) Patent No.: US 6,793,994 B2
(45) Date of Patent: Sep. 21, 2004

(54) OXYGEN SCAVENGING POLYMER COMPOSITIONS CONTAINING ETHYLENE VINYL ALCOHOL COPOLYMERS

(75) Inventors: Mingliang L. Tsai, Holmdel, NJ (US); Murali K. Akkapeddi, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 196 days.

(21) Appl. No.: 09/800,749

(22) Filed: Mar. 7, 2001

(65) Prior Publication Data

US 2002/0176953 A1 Nov. 28, 2002

(51) Int. Cl.[7] .............................................. B29D 22/00
(52) U.S. Cl. ................... 428/35.7; 428/474.4; 525/168; 525/171; 525/177; 525/298; 525/445
(58) Field of Search ............................... 428/35.7, 36.6, 428/36.7; 524/398, 399

(56) References Cited

U.S. PATENT DOCUMENTS

| | | | |
|---|---|---|---|
| 4,464,443 A | * 8/1984 | Farrell et al. ................ 428/688 |
| 5,055,355 A | 10/1991 | DeAntonis et al. ...... 428/476.3 |
| 5,605,996 A | * 2/1997 | Chuu et al. .................. 526/340 |
| 5,700,554 A | * 12/1997 | Speer et al. ................ 428/220 |
| 5,942,297 A | * 8/1999 | Ve Speer et al. .......... 428/35.4 |
| 6,074,717 A | * 6/2000 | Little et al. ................ 428/35.7 |
| 6,346,308 B1 | * 2/2002 | Cahill et al. ................ 428/35.7 |
| 6,410,156 B1 | * 6/2002 | Akkapeddi et al. ...... 428/476.1 |
| 2002/0002238 A1 | 1/2002 | Laplante et al. .............. 525/50 |

FOREIGN PATENT DOCUMENTS

| | | |
|---|---|---|
| EP | 0 507 207 | 10/1992 |
| EP | 1 033 080 | 9/2000 |
| JP | 10287871 | * 10/1998 |
| WO | WO 01 83318 | 11/2001 |

* cited by examiner

*Primary Examiner*—Sandra M. Nolan
(74) *Attorney, Agent, or Firm*—Virginia Szigeti

(57) ABSTRACT

Oxygen barrier polymer compositions exhibiting high oxygen scavenging capability suitable for extended shelf-life, packaging applications. These polymer compositions comprise at least one ethylene vinyl alcohol copolymer, at least one oxidizable polydiene, and at least one metal salt catalyst. The polymer products are particularly suited to making barrier packaging articles such as monolayer or multi-layer films, sheets, tubes, pipes, thermoformed containers and coinjection/coextrusion blow molded bottles comprising PET, polyolefin or polycarbonate as structural layers. Such articles are useful in a variety of oxygen-sensitive food, beverage, pharmaceutical and health care product packaging applications.

48 Claims, No Drawings

OXYGEN SCAVENGING POLYMER COMPOSITIONS CONTAINING ETHYLENE VINYL ALCOHOL COPOLYMERS

BACKGROUND OF THE INVENTION

1. Field of the Invention

The present invention relates to polymer compositions. More particularly, the invention relates to oxygen scavenging polymer compositions containing ethylene vinyl alcohol (EVOH) copolymers, which compositions exhibit extremely low oxygen transmission rates (OTR) at various relative humidity (RH) levels. Such compositions are useful for the production of bottles, containers, and other long shelf-life applications for packaging a variety of oxygen-sensitive food and beverage products such as beers, juices, condiments, fresh and processed meats as well as certain pharmaceutical and health care products.

2. Description of the Related Art

It is well known in the art to provide polymer based packaging articles such as films, bottles, containers, and the like, which are useful for food packaging. Many such articles are made of plastics such as ethylene vinyl alcohol copolymers in order to achieve the desired barrier properties. For example, U.S. Pat. Nos. 5,055,355 and 5,547,765 teach laminates of polyamides and ethylene vinyl alcohol copolymers which have good oxygen barrier properties.

In order to enhance freshness preservation, it is a standard practice to package food and beverage products within a packaging structure composed of laminated sheets of two or more plastics. Such packaging structures generally include a barrier plastic layer which has a low permeability to oxygen. The packaging structure can be thin, in which case it is wrapped around the item being packaged, or it can be thick enough to form a shaped container body such as a bottle.

It is known in the art to include an oxygen scavenger in the packaging structure. An oxygen scavenger reacts with oxygen that is trapped in the package or that permeates from outside into the package. This is described, for example, in U.S. Pat. Nos. 4,536,409 and 4,702,966. U.S. Pat. No. 4,536,409 describes cylindrical containers formed from such packaging plastics.

Various types of oxygen scavengers have been proposed for this purpose. U.S. Pat. No. 4,536,409 recommends potassium sulfite as an oxygen scavenger. U.S. Pat. No. 5,211,875 discloses the use of unsaturated hydrocarbons as oxygen scavengers in packaging films. It is known in the art that ascorbic acid derivatives as well as sulfites, bisulfites, phenolics, and the like can be oxidized by molecular oxygen, and can thus serve as an oxygen scavenging material. U.S. Pat. No. 5,075,362 discloses the use of ascorbate compounds in containers as oxygen scavengers. U.S. Pat. Nos. 5,202,052 and 5,364,555 describe polymeric material carriers containing oxygen scavenging material. These polymeric carriers for the oxygen scavenging material include polyolefins, polyvinylchloride (PVC), polyurethanes, ethylene vinyl acetate (EVA) and polyethylene terephthalate (PET).

U.S. Pat. Nos. 5,021,515, 5,049,624 and 5,639,815 disclose packaging materials and processes therefor which utilize a polymer composition which is capable of scavenging oxygen. Such compositions include an oxidizable organic polymer component, preferably a polyamide, such as nylon MXD6, and a metal oxidation promoter, such as a cobalt compound. These compositions can be used with PET, for example.

U.S. Pat. No. 5,529,833 describes the use of a composition comprising an ethylenically unsaturated hydrocarbon oxygen scavenger which is incorporated into a film layer, and used for making packaging for oxygen sensitive products. The oxygen scavenger is catalyzed by a transition metal catalyst and a chloride, acetate, stearate, palmitate, 2-ethylhexanoate, neodecanoate or naphthenate counterion. Preferred metal salts are selected from cobalt (II) 2-ethylhexanoate and cobalt (II) neodecanoate. Because water deactivates the oxygen scavenger composition, the composition can only be used for packaging for dry materials.

Despite these advances in the art, many known oxygen barrier materials, particularly those containing EVOH, are extremely moisture sensitive and lose their oxygen barrier at high relative humidity (RH) levels. A need exists for an oxygen barrier polymer material which can provide high oxygen scavenging capability while maintaining extremely low oxygen transmission rates at high relative humidity (RH) levels.

Another use of oxygen barrier materials is in the retort process which has been commonly employed for pouches and containers in various food applications as well as certain pharmaceutical, medical and health care products. Retorting is a process wherein a sample is conditioned at 121° C. for 30 minutes. Most oxygen barrier polymers including standard EVOH cannot survive at these retort conditions. The layers either becomes distorted/delaminated and turns hazy due to the severe heat history, or they lose their oxygen barrier property during or after retorting due to absorbed moisture. U.S. Pat. Nos. 5,716,715, 5,547,765 and Japan Patent Nos. 2000108256, 11199741, 9234833 describe methods to make EVOH retortable. Even in these examples where retortable EVOH remains clear after retort, retortable EVOH still exhibits moisture sensitivity as well as retort shock, in which the moisture is trapped in EVOH layer and thus worsens the oxygen barrier.

It would be desirable to provide a barrier material which can provide high oxygen scavenging and extremely low oxygen transmission rates (OTR) at high relative humidity (RH) levels, before and after retort, as well as provide a solution to the problems mentioned above.

SUMMARY OF THE INVENTION

The invention provides an oxygen-scavenging polymer composition which comprises:
a) at least one ethylene vinyl alcohol copolymer;
b) at least one oxidizable polydiene; and
c) at least one metal salt catalyst.

The invention further provides an oxygen barrier film comprising a layer of a polymer composition which comprises:
a) at least one ethylene vinyl alcohol copolymer;
b) at least one oxidizable polydiene; and
c) at least one metal salt catalyst.

The invention still further provides a multilayer article which comprises:
a) a polymer composition layer comprising at least one ethylene vinyl alcohol copolymer; at least one oxidizable polydiene; and at least one metal salt catalyst; and
b) a thermoplastic polymer layer on one or both sides of the polymer composition layer.

The invention still further provides a shaped article which comprises a polymer composition comprising:
a) at least one ethylene vinyl alcohol copolymer;

b) at least one oxidizable polydiene; and c) at least one metal salt catalyst.

The invention still further provides a process for producing a polymer composition which comprises:

a) melting at least one ethylene vinyl alcohol copolymer;

b) blending the molten copolymer with at least one oxidizable polydiene and at least one metal salt catalyst to thereby form a mixture; and c) cooling the mixture.

The invention still further provides a process for producing an oxygen barrier film which comprises:

a) melting at least one ethylene vinyl alcohol copolymer;

b) blending the molten copolymer with at least one oxidizable polydiene and at least one metal salt catalyst to thereby form a mixture;

c) extruding, casting or blowing the mixture into a film; and d) cooling the film.

The invention still further provides a process for producing an oxygen barrier polymer film which comprises:

a) melting a composition which comprises at least one ethylene vinyl alcohol copolymer; at least one oxidizable polydiene; and at least one metal salt catalyst;

b) extruding, casting or blowing the composition into a film; and c) cooling the film.

The invention still further provides a process for producing a multilayer article which comprises:

a) melting at least one ethylene vinyl alcohol copolymer; at least one oxidizable polydiene; and at least one metal salt catalyst to thereby form a mixture;

b) separately melting a thermoplastic polymer composition;

c) coextruding, casting, blowing, thermoforming, blow molding or coinjecting the mixture and thermoplastic polymer composition into a multilayer article; and d) cooling the article.

The invention still further provides a process for producing a multilayer article which comprises:

a) melting at least one ethylene vinyl alcohol copolymer; at least one oxidizable polydiene; and at least one metal salt catalyst to thereby form a mixture;

b) separately melting a thermoplastic polymer composition;

c) coinjecting molding the mixture and thermoplastic polymer composition into a multilayer preform;

d) reheating the perform; and e) blow molding the perform into a multilayer article.

The invention still further provides a multilayer article formed by a process comprising:

a) melting at least one ethylene vinyl alcohol copolymer; at least one oxidizable polydiene; and at least one metal salt catalyst to thereby form a mixture;

b) separately melting a thermoplastic polymer composition;

c) coinjecting molding the mixture and thermoplastic polymer composition into a multilayer preform;

d) reheating the perform; and e) blow molding the perform into a multilayer article.

The polymer compositions of this invention are suitable for forming articles and films having extremely low oxygen transmission rates, and which serve as barrier layers suitable for extended shelf-life packaging of oxygen-sensitive food and beverage products.

This invention further provides an oxygen barrier material which can provide high oxygen scavenging and extremely low oxygen transmission rates (OTR) at high relative humidity (RH) levels, before and after retort. The polymer compositions of this invention are suitable for forming articles and films having extremely low oxygen transmission rates, and which serve as barrier layers suitable for extended shelf-life packaging of oxygen-sensitive food as well as pharmaceutical and medical products.

Desirably, the polymer compositions of this invention also comprise of a nanometer scale dispersed platelet type clay to further augment the barrier and oxygen scavenging properties. Such clays are normally referred to as nanoclays and they are normally composed of organo-ammonium cation exchanged montmorillonite or hectorite type smectitic clays.

DETAILED DESCRIPTION OF THE PREFERRED EMBODIMENT

According to the present invention, an improved oxygen-scavenging barrier polymer composition having an extremely low oxygen transmission rate at varying relative humidity (RH) levels is prepared by combining an ethylene vinyl alcohol copolymer; at least one oxidizable polydiene; and at least one metal salt catalyst.

The polymer composition of the invention comprises an ethylene vinyl alcohol copolymer. Such copolymers suitable for use in the present invention can be prepared by the methods disclosed in U.S. Pat. Nos. 3,510,464; 3,560,461; and 3,585,177.

The ethylene vinyl alcohol copolymer can be hydrolyzed from ethylene vinyl acetate copolymer. The degree of hydrolysis can range from 85 to 99.5%. The ethylene vinyl alcohol copolymer preferably contains from about 10 to about 65 mol percent ethylene, and more preferably from about 25 to about 50 mol percent ethylene. Copolymers of lower than about 10 mol percent ethylene tend to be difficult to extrude while those above 65 mol percent ethylene have reduced oxygen barrier performance, as described in U.S. Pat. No. 3,595,740.

Useful ethylene vinyl alcohol copolymers suitable for the present invention are commercially available from Kuraray, Nippon Gohsei, both in Japan, and EVAL Company of America, Noltex, both in US. Kuraray of Japan produces an ethylene vinyl alcohol copolymer under the designation "EP-E" which has about 44% ethylene, a number average molecular weight of about 29,500 and melting point of 164° C. Other manufacturers produce suitable ethylene vinyl alcohol copolymers. One suitable copolymer has about 32% ethylene with a melting point of 183° C. Another grade has about 29% ethylene, a number average molecular weight of about number average 22,000 and a melting point of about 188° C. Another described in U.S. Pat. No. 4,252,169 has 40% ethylene, a number average molecular weight of about 26,000 and a melting point of 164° C. The number average molecular weight can be measured by osometry.

The ethylene vinyl alcohol copolymer comprising compositions of the invention preferably exhibit good oxygen barrier property such as an oxygen permeability of <1 cc.mil/100 $in^2$/day in 100% oxygen at 25° C. The ethylene vinyl alcohol copolymer component present in the overall composition preferably ranges from about 1% to about 99% by weight of the overall composition, preferably from about 5% to about 98% by weight of the overall composition, and more preferably from about 7% to about 97% by weight of the overall composition.

Most preferably, the polymer composition of the invention preferably comprises an ethylene vinyl alcohol copolymer which is retortable. Retortable is defined such that the composition remains clear without distortion after conditioning at 121° C. for 30 minutes. Such retortable ethylene vinyl alcohol copolymers suitable for use in the present invention can be prepared by the methods disclosed in Japan Patent Application No. 2000108256, 11199741, 9234833, 6345919, 5271498. Standard EVOH, without modification, cannot survive the retort conditions. There are also methods that can make EVOH retortable. One is by blending EVOH with aliphatic or aromatic polymaides as described by U.S. Pat. Nos. 5,716,715, 5,547,76. Other materials can be also added to EVOH to make it retortable, which are disclosed in above mentioned Japan Patents. Commercially available retortable grades of EVOH include SG372 from Nippon Gohsei and XEP 335 from Kuraray and EVAL Company of America.

The polymer composition of the invention also contains at least one functional, oxidizable polydiene which serves as an oxygen scavenger, which is preferably dispersed as small particles which are compatible with and uniformly distributed throughout the polymer composition. It must be noted that the ethylene vinyl alcohol copolymer matrix itself is not oxidizable under the ambient conditions of use of these materials as barrier packaging articles. Hence an oxidizable polydiene is used as the oxygen scavenger in the compositions of this invention. Preferably the oxidizable polydiene comprises an anhydride functionality such that it reacts with the hydroxyl pendant groups on the ethylene vinyl alcohol copolymer. Preferred functional polydienes include functional polyalkadiene oligomers which can have the following general backbone structure:

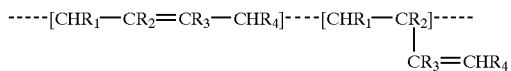

where $R_1$, $R_2$, $R_3$ and $R_4$ can be the same or different and can be selected from hydrogen (—H) or any of the lower alkyl groups (methyl, ethyl, propyl, butyl etc.). $R_2$ and $R_3$ may also be a chloro (—Cl) group. Illustrative of the backbone structure are polybutadiene (1,4 or 1,2 or mixtures of both), polyisoprene (1,4 or 3,4), poly 2,3-dimethyl butadiene, polychloroprene, poly 2,3-dichlorobutadiene, polyallene, poly 1,6-hexatriene, etc.

Specific non-limiting examples of functional, oxidizable polydienes as suitable oxygen scavengers include epoxy functionalized polybutadiene (1,4 and/or 1,2), maleic anhydride grafted or copolymerized polybutadiene (1,4 and/or 1,2), epoxy functionalized polyisoprene, and maleic anhydride grafted or copolymerized polyisoprene. The preferred oxygen scavenger is an anhydride modified polybutadiene oligomer.

A preferred oxygen scavenger includes an anhydride functional polybutadiene oligomer. The oxygen scavenger is preferably present in the polymer composition as a large number of small particles. The molecular weight of the functional polydiene oligomer preferably ranges from about 500 about to 10,000, preferably from about 750 to about 3000 and most preferably from about 1000 to about 2000. It is preferably present in the overall composition in an amount of from about 0.1% to about 10% by weight, more preferably from about 1% to about 10% and most preferably from about 2% to about 5%. The functional, oxidizable polydiene is preferably present in the form of particles whose average particle size is in the range of from about 10 nm to about 5000 nm, and wherein the particles are substantially uniformly distributed throughout the polymer composition. The polymer composition may comprise either a blend of the ethylene vinyl alcohol copolymer and the oxidizable polydiene or a reaction product of the ethylene vinyl alcohol copolymer with the oxidizable polydiene.

The polymer composition preferably further comprises a metal salt catalyst such as a metal carboxylate salt catalyst. Suitable metal carboxylate salt catalysts have a counterion which is an acetate, stearate, propionate, hexanoate, octanoate, benzoate, salicylate, cinnamate, and combinations thereof. Preferably the metal carboxylate salt catalyst is a cobalt, copper or ruthenium, acetate, stearate, propionate, hexanoate, octanoate, benzoate, salicylate or cinnamate, or combinations thereof. The preferred metal carboxylate is cobalt, ruthenium or copper carboxylate. Of these the more preferred is cobalt or copper carboxylate and the most preferred is cobalt carboxylate. It is present in the overall composition in an amount of from about 0% to about 1% by weight, preferably from about 0.001% to about 0.5% and more preferably from about 0.005% to about 0.1%. The most preferred range is from about 0.01% to about 0.05%.

Optionally but preferably, the composition further comprises a nanometer scale dispersed clay, known in the art as a nanoclay. Suitable clays are described in U.S. Pat. No. 5,747,560, which is incorporated herein by reference. Preferred clays non-exclusively include a natural or synthetic phyllosilicate such as montmorillonite, hectorite, vermiculite, beidilite, saponite, nontronite or synthetic flouromica, which has been cation exchanged with a suitable organoammonium salt. The preferred clay is montmorillonite, hectorite or synthetic flouromica. The more preferred clay is the montmorillonite or hectorite. The most preferred clay is montmorillonite. The preferred organoammonium cation for treating the clay is N,N',N",N"'Bis (hydroxyethyl), methyl, octadecyl ammonium cation or ω-carboxy alkylammonium cation, i.e., the ammonium cation derived such ω-aminoalkanoic acids as 6-aminocaproic acid, 11-aminoundecanoic acid, 12-aminododecanoic acid. The preferred fine dispersions of nanometer scale silicate platelets are obtained either via an in-situ polymerization of polyamide forming monomer(s) or via melt compounding of polyamide in the presence of the organoammonium salt treated clay. The clay has an average platelet thickness in the range of from about 1 nm to about 100 nm and an average length and average width each in the range of from about 50 nm to about 500 nm. It is present in the overall composition in an amount of from about 0% to about 10% by weight, preferably from about 2% to about 8% and more preferably from about 3% to about 6%.

The polymer composition of the invention may also optionally contain a base catalyst which serves to promote the grafting reaction of ethylene vinyl alcohol copolymer with epoxy functional polydienes, when such materials are used as the oxidizable diene components. Suitable base catalysts nonexclusively include Group I or II hydroxides or alkoxides, such as sodium hydroxide, sodium bicarbonate, sodium methoxide, potassium hydroxide, potassium ethoxide, potassium butoxide and other basic inorganic metal hydroxides and alkoxides and the like. Preferred base catalysts include sodium bicarbonate, sodium hydroxide, sodium methoxide and sodium ethoxide. Of these, most preferred include sodium methoxide and sodium ethoxide. Such may be used in amounts of up to about 10% by weight of the overall composition.

The composition of the invention may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators, plasticizers, as well as other conventional additives known to the art. Such may be used in amounts of up to about 10% by weight of the overall composition.

Suitable ultraviolet light stabilizers include various substituted resorcinols, salicylates, benzotriazole, benzophenones, and the like. Suitable lubricants and mold release agents include stearic acid, stearyl alcohol, and stearamides. Suitable flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Suitable plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

Suitable fillers and extenders include fine particle size (0.01 $\mu$m to 10 $\mu$m) inorganic fillers, including those of platelet or granular nature, as wells as mixtures thereof. The more preferred particle sizes are in the range of 0.05 $\mu$m–5 $\mu$m. The most preferred particle size is in the range of 0.1 $\mu$m–1 $\mu$m. These fillers include mica, clay, kaolin, bentonite, and silicates, including alumina silicate. Other fine particle fillers include metal oxides, such as alumina, silica, magnesium oxide, zirconium oxide, titanium oxide. Other fine particle size include carbonates such as calcium carbonate, magnesium carbonate, and dolomite, sulfates including calcium sulfate and barium sulfate, as well as other materials not specifically denoted here.

Preferably the polymer compositions are produced via a melt extrusion compounding of the ethylene vinyl alcohol copolymer with the other composition components. The composition may be formed by dry blending solid particles or pellets of each of the composition components and then melt blending the mixture in a suitable mixing means such as an extruder, a roll mixer or the like. Typical melting temperatures range from about 200° C. to about 270° C., preferably from about 210° C. to about 260° C. and more preferably from about 220° C. to about 250° C. for EVOH and its blends. Blending is conducted for a period of time required to attain a substantially uniform blend. Such may easily be determined by those skilled in the art. If desired, the composition may be cooled and cut into pellets for further processing, it may be extruded into a fiber, a filament, or a shaped element or it may be formed into films and optionally uniaxially or biaxially stretched by means well known in the art.

Barrier films and articles of this invention may be produced by any of the conventional methods of producing films and articles, including extrusion and blown film techniques, bottles via extrusion or injection stretch blow molding and containers via thermoforming techniques. Processing techniques for making films, sheets, tubes, pipes, containers and bottles are well known in the art. For example, the polymer components may be preblended and then the blend fed into an infeed hopper of an extruder, or each component may be fed into infeed hoppers of an extruder and then blended in the extruder. The melted and plasticated stream from the extruder is fed into a single manifold die and extruded into a layer. It then emerges from the die as a single layer film. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Once cooled and hardened, the result film is preferably substantially transparent.

Alternatively the composition may be formed into a film using a conventional blown film apparatus. The film forming apparatus may be one which is referred to in the art as a "blown film" apparatus and includes a circular die head for bubble blown film through which the plasticized film composition is forced and formed into a film "bubble". The "bubble" is ultimately collapsed and formed into a film.

The composition may also be used to form shaped article through any well known process, including extrusion blow molding and injection stretch-blow molding. An injection molding process softens the composition in a heated cylinder, injecting it while molten under high pressure into a closed mold, cooling the mold to induce solidification, and ejecting the molded preform from the mold. Molding compositions are well suited for the production of preforms and subsequent reheat stretch-blow molding of these preforms into the final bottle shapes having the desired properties. The injection molded preform is heated to suitable orientation temperature in the 100° C.–150° C. range and then stretch-blow molded. The latter process consists of first stretching the hot preform in the axial direction by mechanical means such as by pushing with a core rod insert followed by blowing high pressure air (up to 500 psi) to stretch in the hoop direction. In this manner, a biaxially oriented blown bottle is made. Typical blow-up ratios range from 5/1 to 15/1.

The polymer composition of this invention may be formed as an integral layer in a multilayered film, bottle or container which include one or more layers of another thermoplastic polymer such as polyesters—particularly polyethylene terephthalate (PET) and PET copolymers, polyolefins, acrylonitrile copolymers, acrylic polymers, vinyl polymers, polycarbonate, polystyrene, etc. The composition of this invention is particularly suitable as a barrier layer in the construction and fabrication of multilayer bottles and thermoformed containers in which PET or polyolefin function as structural layers. Such PET/polymer multilayer bottles can be made by coinjection stretch-blowmolding process similar to the injection-stretch blowmolding process describe before. Similarly, polymer/polyolefin multilayer bottles can be made by coextrusion blowmolding. The latter process usually employs suitable tie layers for adhesion.

Useful polyesters for coinjection stretch blowmolding process include polyethylene terephthalate (PET) and its copolymer in the intrinsic viscosity (I.V.) range of 0.5–1.2 dl/g range, more preferably in the I.V. range of 0.6 to 1.0 and most preferably in the I.V. range of 0.7–0.9. The polyolefins used in the coextrusion blowmolding include polymers of alpha-olefin monomers having from about 2 to about 6 carbon atoms and includes homopolymers, copolymers (including graft copolymers), and terpolymers of alpha-olefins. Illustrative homopolymer examples include ultra low density (ULDPE), low density (LDPE), linear low density (LLDPE), medium density (MDPE), or high density polyethylene (HDPE); polypropylene; polybutylene; polybutene-1; poly-3-methylbutene-1; poly-pentene-1; poly-4-methylpentene-1; polyisobutylene; and polyhexene. The polyolefin may have a weight average molecular weight of about 1,000 to about 1,000,000, and preferably about 10,000 to about 500,000. Preferred polyolefins are polyethylene, polypropylene, polybutylene and copolymers, and blends thereof. The most preferred polyolefins are polyethylene and polypropylene.

Additional layers may also include adhesive tie layers to tie various layers together. Non-limiting examples of other optional polymeric layers and adhesive or tie layers which can be used in the film laminate of the present invention are disclosed in U.S. Pat. Nos. 5,055,355; 3,510,464; 3,560,461; 3,847,845; 5,032,656; 3,585,177; 3,595,740; 4,284,674; 4,058,647; and 4,254,169.

Multilayered barrier articles of this invention can be formed by any conventional technique for forming films, including lamination, extrusion lamination, coinjection, stretch-blow molding and coextrusion blowmolding. The preferred method for making multilayer film is by coextrusion. For example, the material for the individual layers, as well as any optional layers, are fed into infeed hoppers of the extruders of like number, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Alternatively the individual layers may first be formed into sheets and then laminated together under heat and pressure with or without intermediate adhesive layers.

Optionally, an adhesive layer, also known in the art as a "tie" layer, may be placed between each film layer. In accordance with the present invention, suitable adhesive polymers include modified polyolefin compositions having at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. Of these, the most preferred is maleic anhydride. The modified polyolefins suitable for use in this invention include compositions described in U.S. Pat. Nos. 3,481,910; 3,480,580; 4,612,155 and 4,751,270 which are incorporated herein by reference. Other adhesive layers non-exclusively include alkyl ester copolymers of olefins and alkyl esters of $\alpha,\beta$-ethylenically unsaturated carboxylic acids such as those described in U.S. Pat. No. 5,139,878. The preferred modified polyolefin composition comprises from about 0.001 and about 10 weight percent of the functional moiety, based on the total weight of the modified polyolefin. More preferably the functional moiety comprises from about 0.005 and about 5 weight percent, and most preferably from about 0.01 and about 2 weight percent. The modified polyolefin composition may also contain up to about 40 weight percent of thermoplastic elastomers and alkyl esters as described in U.S. Pat. No. 5,139,878. Alternatively, one or more adhesive polymers may be directly blended or coextruded into other layers of the film, thus providing adhesion while minimizing the number of layers in the film.

Films produced according to the present invention may be oriented by stretching or drawing the films at draw ratios of from about 1.1:1 to about 10:1 in at least one direction, and preferably at a draw ratio of from about 2:1 to about 5:1 in at least one direction. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film.

Such films may be stretched or oriented in any desired direction using methods well known to those skilled in the art. The film may be stretched uniaxially in either the longitudinal direction coincident with the direction of movement of the film being withdrawn from the film forming apparatus, also referred to in the art as the "machine direction", or in as direction which is perpendicular to the machine direction, and referred to in the art as the "transverse direction", or biaxially in both the longitudinal direction and the transverse direction.

The thickness of such films according to the invention preferably ranges from about 0.05 mils (1.3 $\mu$m) to about 100 mils (2540 $\mu$m), and more preferably from about 0.05 mils (1.3 $\mu$m) to about 50 mils (1270 $\mu$m). While such thicknesses are preferred as providing a readily flexible film, it is to be understood that other film thicknesses may be produced to satisfy a particular need and yet fall within the scope of the present invention; such thicknesses which are contemplated include plates, thick films, and sheets which are not readily flexible at room temperature (approx. 20° C.).

One noteworthy characteristic of the articles made from the compositions of this invention is that they exhibit excellent gas barrier properties, particularly oxygen barrier properties. Oxygen permeation resistance or barrier may be measured using the procedure of ASTM D-3985. In general, the films of this invention have an oxygen transmission rate (OTR) at 90% relative humidity (RH) of less than about 1.0 $cm^3/100$ $in^2$ (645 $cm^2$)/24 hrs/Atm at 25° C. using 100% oxygen, and preferably less than about 0.5 $cm^3/100$ $in^2$ (645 $cm^2$)/24 hrs/Atm at 25° C.

The following non-limiting examples serve to illustrate the invention. It will be appreciated that variations in proportions and alternatives in elements of the components of the invention will be apparent to those skilled in the art and are within the scope of the present invention.

PROCESSING DETAILS

Reactive Extrusion

Process 1: A Leistritz 18-mm co-rotating twin screw extruder equipped with a K-Tron volumetric feeder was employed. The modified polybutadiene (either maleic anhydride functionalized polybutadiene—Ricon 131MA5 or epoxy functionalized polybutadiene—Elf-Atochem Poly BD 600/Poly BD605E) was stored in a sealed drum and metered with a Nichols-Zenith pump directly into a sealed extruder barrel directly following the feed barrel. The polybutadiene was injected prior to the first (of two) mixing zones via a Leistritz direct liquid injection nozzle. Ethylene vinyl alcohol copolymer (EVOH) pellets, or blends of EVOH/polyamide, or other materials, were fed into the nitrogen-blanketed throat of the extruder at a rate of 10 pounds (22 kg) per hour. The polybutadiene was pumped at a rate such that weight percentages of 1% to 5% polybutadiene were added. The extruder was equipped with two mixing zones consisting primarily of kneading elements. The extruder was equipped with a vacuum zone subsequent to the second mixing zone and prior to the die plate. The extrudate was quenched in a water bath and then pelletized.

Process 2: A Leistritz 18-mm co-rotating twin screw extruder equipped with a K-Tron volumetric feeder was employed. A blend of EVOH pellets and cobalt stearate pastilles were fed into the nitrogen-blanketed throat of the extruder at a rate of 10 pounds (22 kg) per hour. The blend in one formulation consisted of 95% EVOH (32% ethylene content) and 5% cobalt stearate. The other formulation consisted of 95% nylon 6 (73 Formic acid viscosity) and 5% cobalt stearate. The extruder was equipped with two mixing zones consisting primarily of kneading elements. The extrudate was quenched in a water bath and then pelletized. The resulting pellet was used as a masterbatch additive in some of the processes listed below.

Process 3: A Leistritz 18-mm co-rotating twin screw extruder equipped with a K-Tron volumetric feeder was employed. The polybutadiene (either maleic anhydride functionalized polybutadiene—Ricon 131MA5 or epoxy functionalized polybutadiene—Elf-Atochem Poly BD 600/Poly BD 605E) was stored in a sealed drum vessel and metered with a Nichols-Zenith pump directly in the extruder barrel following the feed throat. The polybutadiene was injected directly into the extruder prior to the first (of two) mixing zones via a Leistritz direct liquid injection nozzle. A blend of EVOH and cobalt stearate masterbatch was fed into the nitrogen-blanketed throat of the extruder at a rate of 10 pounds per hour. The blend consisted of approximately 98 weight percent EVOH and 2 weight percent cobalt masterbatch. The polybutadiene was pumped at a rate such that weight percentages of 1% to 5% polybutadiene were added. The extruder was equipped with two mixing zones consisting primarily of kneading elements. The extruder was equipped with a vacuum zone subsequent to the second mixing zone and prior to the die plate. The extrudate was quenched in a water bath and then pelletized.

Pellet Blending

Process 4: Blending of 98 weight percent material prepared in process 1 (or other material) and 2 weight percent material prepared in process 2. Blending was accomplished by weighing out required amount of each material into a large container. The container was tumbled for approximately 5 minutes to ensure thorough mixing of the two components. These blends were used subsequently as feedstock for cast film processing.

Monolayer Film

Process 5: A 19 mm Haake single screw extruder equipped with a six-inch (152.4 mm) wide film die was flood fed with pellets from process 3 or 4. Extruder temperature was set at approximately 240° C. The extrudate passed through the slit die onto a heated Killion cast roll. Film thickness was adjusted via cast roll speed and/or screw RPM to prepare a film with typical thickness of 0.001 inch to 0.004 inch (0.0254 to 0.1016 mm).

Multilayer Film

Process 6: Three Killion single screw extruders equipped with a twelve-inch wide film coextrusion die were utilized to prepare a multilayer film (three and five in most cases). One extruder was flood fed with pellets from process 3 and made into an inner layer. The second extruder was flood fed with various polymers into two outer layers, such as PE, PP, Nylon, PC, PET, etc. The third extruder was flood fed with an adhesive resin (also known as tie resins) which can effectively bind together the incompatible polymers such as the center EVOH layer from the first extruder and the skin layers from the second extruder. For example, low density PE (7 melt index, ASTM D1238) was flood fed in the second extruder, while the adhesive resin (5 melt index ASTM D1238, maleic anhydride modified PE, made by Mitsui Chemicals America, Inc.) was extruded in the third extruder in order to make a PE/tie/modified EVOH/tie/PE structure. Extruder temperatures were approximately 240–250° C. in all three extruders. Extrudates passed through the slit die onto a heated cast roll. Film thickness was adjusted via cast roll speed and/or screw RPM to prepare a film of the following thickness: 0.001 inch (0.0254 mm) each of PE outer layers, 0.00025 inch (0.00635 mm) each of the adhesive layer and 0.001 inch (0.0254 mm) active barrier EVOH inner layer.

Oxygen Transmission Measurements

Oxygen transmission measurements were conducted on film samples on a Mocon Oxtran 2/20 apparatus equipped with SL sensors. Tests were conducted at various relative humidity using 100% oxygen. Data were collected as a function of time and recorded in units of: cc/100 in$^2$/day.

DESCRIPTION OF EXAMPLES

Listed in the Tables 1 and 2 are the summarized results obtained from the following examples which illustrate the effect on oxygen transmission rate of the oxygen binding system described herein.

Comparative Examples 1–7

Comparative Examples 1–7 are useful as reference points or "baselines" for the examples which will be described later. Comparative Example 1 is a standard grade EVOH (32% ethylene content, DC3203) which was commercially available from Nippon Gohsei. Comparative Example 2 is an EVOH (32% ethylene content, DC3203, Nippon Gohsei) containing 100 ppm cobalt. Comparative Example 2 illustrates that a 100 ppm addition of cobalt to EVOH has no affect on the oxygen transmission rate of EVOH. Comparative Example 3 is the same as Comparative Example 2 except nylon 6 was used as a carrier in cobalt masterbatch preparation in process step 3 instead of EVOH. Comparative Example 3 illustrates that the addition of about 2% nylon 6 worsens the oxygen transmission rate. Comparative Example 4 is an EVOH (32% ethylene content, DC3203, Nippon Gohsei) containing 3 weight percent Poly BD 131MA5. This example illustrates that the addition of 3 weight percent Poly BD 131MA5 (maleic anhydride functionalized 1,3 polybutadiene) to EVOH worsens the oxygen transmission rate. Comparative Example 5 is a retortable grade EVOH (32% ethylene content, SG372) which was commercially available from Nippon Gohsei. Comparative Example 6 is a retortable EVOH (32% ethylene content, SG372, Nippon Gohsei) containing 100 ppm cobalt. Comparative Example 6 illustrates that a 100 ppm addition of cobalt to EVOH has no affect on the oxygen transmission rate of EVOH. Comparative Example 7 is a retortable (32% ethylene content, SG372) containing 3 weight percent Poly BD 131MA5. This example illustrates that the addition of 3 weight percent Poly BD 131MA5 (maleic anhydride functionalized 1,3 polybutadiene) to EVOH worsens the oxygen transmission rate.

Examples 1–5

Examples 1–5 illustrate the effect of the oxygen binding system on the oxygen transmission rate of EVOH as a monolayer film. The examples illustrate the dramatic improvement in oxygen binding ability of the EVOH of this invention. In general, in all examples the oxygen binding maleic anhydride functionalized polybutadiene is nano/micro-phase separated from the EVOH matrix with polybutadiene particle sizes on the order of 10–5000 nm. Example 1 is an example of this invention using a standard grade of EVOH (32% ethylene content, DC3203, made by Nippon Gohsei) and containing 3 weight percent Poly BD 131MA5 and 100 ppm by weight of cobalt. Samples of this example were prepared by methods 1, 2, 4 and 5 (described above). Example 2 is the same as Example 1 except nylon 6 was used in the cobalt masterbatch preparation instead of EVOH. Example 3 is the same as Example 1 except it was prepared by methods 3 and 5. Example 4 is the same as Example 1 except EVOH used is a 27% ethylene content EVOH (L101A) made by EVAL Company of America. Example 5 is the same as Example 1 except EVOH used is a retortable grade (32% ethylene content, SG372) made by Nippon Gohsei. It is noted that all comparative examples showed a worsening oxygen transmission rate at high relative humidity (i.e., 65% and 90%) as EVOH absorbed moisture and lost its oxygen barrier. On the other hand in Examples 1–5, the oxygen transmission rate remains at almost zero (0.003 or less) oxygen transmission rate across all relative humidity ranges. Examples 1–5 clearly illustrate the unique feature and the novelty of incorporating an oxygen binding system into EVOH and made it insensitive to moisture while maintaining its excellent oxygen barrier, even at high relative humidity ranges as shown in Table 1. It is also noted the near zero oxygen transmission rate was extended much longer at lower relative humidity region instead of 90% shown in Table 2. For example, Example 1 at 80% RH extended the near zero oxygen transmission rate for at least 40 days in 100% oxygen.

Examples 6–7

Examples 6 and 7 illustrate the effect of the oxygen binding system on EVOH which was coextruded in a multilayer structure as described by process step 6. In Examples 6 and 7 of this invention, the inner core layer is always a standard grade of EVOH (32% ethylene content, DC3203, made by Nippon Gohsei) and containing 3 weight percent Poly BD 131MA5 and 100 ppm by weight of cobalt. Example 6 is a five-layer coextruded film consisting of two outer skins of polyethylene (7 melt index, ASTM D1238), two adjacent layers of adhesive layer based on maleic anhydride modified PE (5 melt index), and an inner core layer of oxygen scavenger and cobalt containing EVOH as described above. Examples 6 and 7 were prepared by process steps 1, 2, 4 and 6, in which the core EVOH layer is about 0.001 in (0.0254 mm), adhesive layer about 0.0003 in (0.00762 mm) each side, and outer skin about 0.0008 in (0.0203 mm) each side. Example 7 is the same as Example 6 except the two outer skins were polypropylene (5 melt flow, ASTM D1238), and the two adhesive layers were maleic anhydride modified polypropylene (5 melt flow). It is noted that oxygen transmission rate of the control of Example 6, which was the same as Example 6 except without Poly BD and cobalt, was 0.33 cc/100 in$^2$/day. Oxygen transmission rate of the control of Example 7, which was the same as Example 7 except without Poly BD and cobalt, was 0.46 cc/100 in$^2$/day. The oxygen transmission rate of all control films remained constant without significant drift over time. Therefore Examples 6 and 7 clearly illustrate the dramatic improvement of oxygen binding ability of the EVOH in a multilayer construction of this invention which effectively lowered the oxygen transmission rate to near zero level for a prolonged period of time as shown in Table 2. Similar to Examples 1–5, it is also noted that all samples in Examples 6 and 7 remain at almost zero (0.003 or less) oxygen transmission rate across all relative humidity range as shown in Table 1 as shown in Table 1.

Examples 8–9

Examples 8 and 9 illustrate the effect of the oxygen binding system on a retortable EVOH which was coextruded in a multilayer structure as described in process step 6, before and after retort. Retort is a process where the sample was conditioned at 121° C. for 30 minutes. Standard EVOH cannot survive at the retort condition as EVOH tends to dissolve in the water absorbed during the retort process. The absorbed water in standard EVOH causes structural changes in EVOH as it becomes hazy and loses its oxygen barrier permanently. Retortable grade EVOH, on other hand, can survive the retort and remain clear after retort. In Examples 8 and 9 of this invention, the inner core layer is always a retortable grade of EVOH (32% ethylene content, SG372, made by Nippon Gohsei) and containing 3 weight percent Poly BD 131MA5 and 100 ppm by weight of cobalt. Example 8 is a five-layer coextruded film consisting of two outer skins of polypropylene (5 melt flow rate), two adjacent layers of adhesive layer based on maleic anhydride modified PP copolymer (5 melt flow rate), and an inner core layer of oxygen scavenger and cobalt containing EVOH as described above. Example 9 is a five-layer coextruded film consisting of two outer skins of polycarbonate (18 melt flow rate measured at 300° C. and 1.2 Kg, ASTM D1238, Condition O), two adjacent layers of adhesive layer based on maleic anhydride modified polyolefin copolymer (3 melt index), and an inner core layer of oxygen scavenger and cobalt containing EVOH as described above. Examples 8 and 9 were prepared by process steps 1, 2, 4, and 6. In Example 8, the core EVOH layer is about 0.001 in (0.0254 mm), adhesive layer about 0.0003 in (0.00762 mm) each side, and outer skin about 0.0008 in (0.0203 mm) each side. Example 9 has a core layer about 0.0016 in (0.04064 mm), adhesive layer about 0.0004 in (0.01016 mm) each side and about 0.0004 in (0.01016 mm) of polycarbonate each side. It is noted that in a comparative example of Example 8, which was the same as Example 8 except without Poly BD and cobalt, had an oxygen transmission rate of 0.83 cc/100 in$^2$/day before retort and 1.0 cc/100 in$^2$/day after retort. In Example 8 after retort, the sample was dried in a vacuum for one hour before oxygen transmission rate measurement. In a comparative example of Example 9, which was the same as Example 9 except without Poly BD and cobalt, had an oxygen transmission rate of 0.31 cc/100 in$^2$/day before retort and 1.64 cc/100 in$^2$/day after retort. The oxygen transmission rate of all films without Poly BD and cobalt before retort remained constant without significant drift over time.

Although the use of commercially available retortable grade of EVOH (without Poly BD and cobalt) made the structure remain clear after retort, it still has experienced severe moisture sensitivity as well as retort shock, in which the moisture was trapped in EVOH layer and thus worsens the oxygen barrier. Examples 8 and 9 clearly illustrate the dramatic improvement of oxygen binding ability of the retortable EVOH in a multilayer construction of this invention which effectively lowered the oxygen transmission rate to near zero level for prolonged period of time before and after the retort. All samples in Examples 8 and 9 maintained the near zero oxygen transmission rate across all relative humidity range as shown in Table 1, before and after retort. It is also noted that all samples after retort showed very good appearance without any cracking normally seen in standard EVOH.

TABLE 1

| Example No. | Process Step | Wt. % PBD* | Wt. % EVOH** | Wt. % N6 | PPM Co | OTR† @ 0% RH | OTR† @ 65% RH | OTR† @ 90% RH |
|---|---|---|---|---|---|---|---|---|
| Comparative 1 | 5 | 0 | 100 | 0 | 0 | 0.01 | 0.02 | 0.15 |
| Comparative 2 | 2, 4, 5 | 0 | 100 | 0 | 100 | 0.01 | 0.02 | 0.15 |
| Comparative 3 | 2, 4, 5 | 0 | 98 | 2 | 100 | 0.02 | 0.03 | 0.45 |
| Comparative 4 | 1, 5 | 3 | 97 | 0 | 0 | 0.02 | 0.03 | 0.52 |
| Comparative 5 | 5 | 0 | 100 | 0 | 0 | 0.03 | 0.05 | 0.30 |
| Comparative 6 | 2, 4, 5 | 0 | 100 | 0 | 100 | 0.03 | 0.05 | 0.30 |
| Comparative 7 | 1, 5 | 3 | 97 | 0 | 0 | 0.04 | 0.06 | 1.02 |
| 1 | 1, 2, 4, 5 | 3 | 97 | 0 | 100 | 0.003 | 0.003 | 0.003 |
| 2 | 1, 2, 4, 5 | 3 | 95 | 2 | 100 | 0.003 | 0.003 | 0.003 |
| 3 | 3, 5 | 3 | 97 | 0 | 100 | 0.003 | 0.003 | 0.003 |
| 4 | 1, 2, 4, 5 | 3 | 97 | 0 | 100 | 0.003 | 0.003 | 0.003 |
| 5 | 1, 2, 4, 5 | 3 | 97 | 0 | 100 | 0.003 | 0.003 | 0.003 |

*Ricon PBD 131MA5 (unless otherwise noted)
**Commercially available EVOH from EVALCA and Nippon Gohsei. EVOH thickness was about 0.001 in (0.0254 mm) in all examples.
†Units: cc mil/100 in$^2$/atm day, tested in 100% oxygen at 25° C. To convert to cc mm/m$^2$/atm day, multiply by $3.94 \times 10^{-1}$.

TABLE 2

| Example No. | Process Steps | Wt. % PBD* | Wt. % EVOH** | Wt % Nylon | PPM Co | OTR ‡ Day 1 | OTR Day 2 | OTR Day 3 | OTR Day 4 | OTR Day 5 | OTR Day 7 | OTR Day 10 | OTR Day 15 | OTR Day 20 |
|---|---|---|---|---|---|---|---|---|---|---|---|---|---|---|
| Comp. 1 | 5 | 0 | 100 | 0 | 0 | 0.15 | 0.15 | 0.15 | 0.15 | 0.15 | N/A | N/A | N/A | N/A |
| Comp. 2 | 2, 4, 5 | 0 | 100 | 0 | 100 | 0.15 | 0.15 | 0.15 | 0.15 | 0.15 | N/A | N/A | N/A | N/A |
| Comp. 3 | 2, 4, 5 | 0 | 98 | 2$^a$ | 100 | 0.45 | 0.45 | 0.45 | 0.45 | 0.45 | N/A | N/A | N/A | N/A |
| Comp. 4 | 1, 5 | 3 | 97 | 0 | 0 | 0.52 | 0.52 | 0.52 | 0.52 | 0.52 | N/A | N/A | N/A | N/A |
| Comp. 5 | 5 | 0 | 100 | 0 | 0 | 0.30 | 0.30 | 0.30 | 0.30 | 0.30 | N/A | N/A | N/A | N/A |
| Comp. 6 | 2, 4, 5 | 0 | 100 | 0 | 100 | 0.30 | 0.30 | 0.30 | 0.30 | 0.30 | N/A | N/A | N/A | N/A |
| Comp. 7 | 1,5 | 3 | 97 | 0 | 0 | 1.02 | 1.02 | 1.02 | 1.02 | 1.02 | N/A | N/A | N/A | N/A |
| 1 | 1, 2, 4, 5 | 3 | 97 | 0 | 100 | 0.003 | 0.003 | 0.003 | 0.003 | 0.003 | 0.003 | 0.05 | 0.60 | N/A |
| 2 | 1, 2, 4, 5 | 3 | 95 | 2$^a$ | 100 | 0.003 | 0.003 | 0.003 | 0.003 | 0.003 | 0.003 | 0.05 | 0.65 | N/A |
| 3 | 3, 5 | 3 | 97 | 0 | 100 | 0.003 | 0.003 | 0.003 | 0.003 | 0.003 | 0.003 | 0.05 | 0.60 | N/A |
| 4 | 1, 2, 4, 5 | 3 | 97 | 0 | 100 | 0.003 | 0.003 | 0.003 | 0.003 | 0.003 | 0.003 | 0.04 | 0.55 | N/A |
| 5 | 1, 2, 4, 5 | 3 | 97 | 0 | 100 | 0.003 | 0.003 | 0.003 | 0.22 | 0.60 | 1.1 | 1.2 | 1.2 | N/A |
| 6 | 1, 2, 4, 6 | 3 | 97 | 0 | 100 | 0.003 | 0.003 | 0.003 | 0.003 | 0.003 | 0.02 | 0.45 | N/A | N/A |
| 7 | 1, 2, 4, 6 | 3 | 97 | 0 | 100 | 0.003 | 0.003 | 0.003 | 0.003 | 0.01 | 0.02 | 0.50 | N/A | N/A |
| 8 (before retort) | 1, 2, 4, 6 | 3 | 95 | 2$^a$ | 100 | 0.003 | 0.003 | 0.003 | 0.003 | 0.003 | 0.003 | 0.07 | N/A | N/A |
| 9$^c$ (before retort) | 1, 2, 4, 6 | 3 | 95$^h$ | 2$^a$ | 100 | 0.003 | 0.003 | 0.003 | 0.003 | 0.003 | 0.003 | 0.003 | 0.30 | N/A |
| 8$^b$ (after retort) | 1, 2, 4, 6 | 3 | 95 | 2$^a$ | 100 | 0.003$^b$ | 0.003 | 0.003 | 0.007 | 0.03 | 0.20 | N/A | N/A | N/A |

TABLE 2-continued

| Example No. | Process Steps | Wt. % PBD* | Wt. % EVOH** | Wt % Nylon | PPM Co | OTR ‡ Day 1 | OTR Day 2 | OTR Day 3 | OTR Day 4 | OTR Day 5 | OTR Day 7 | OTR Day 10 | OTR Day 15 | OTR Day 20 |
|---|---|---|---|---|---|---|---|---|---|---|---|---|---|---|
| 9c (after retort) | 1, 2, 4, 6 | 3 | 95h | 2a | 100 | 0.003 | 0.003 | 0.06 | 0.22 | 0.35 | 0.57 | N/A | N/A | N/A |

*Ricon PBD 131MA5 (unless otherwise noted)
**Commercially available EVOH from EVALCA and Nippon Gohsei. EVOH thickness was about 0.001 in (0.0254 mm) in all examples unless otherwise noted.
‡ Units: cc/100 in²/atm day, RH = 90% unless otherwise noted, tested in 100% oxygen at 25° C.
aSample contains 2% nylon 6 which was used as a carrier in preparing cobalt masterbatch.
bSample was dried in vacuum for one hour before oxygen transmission rate measurement.
cEVOH thickness was about 0.0016 in (0.04064 mm) in Example 9.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An oxygen-scavenging polymer composition consisting essentially of:
    a) at least one ethylene vinyl alcohol copolymer;
    b) at least one oxidizable epoxy or anhydride functional polybutadiene; and
    c) at least one metal salt catalyst.

2. The composition of claim 1 wherein the oxidizable epoxy or anhydride functional polybutadiene comprises particles which are substantially uniformly distributed in the polymer composition.

3. The composition of claim 1 wherein the oxidizable epoxy or anhydride functional polybutadiene comprises particles whose average particle size is in the range of from about 10 nm to about 5000 nm, and which particles are substantially uniformly distributed in the polymer composition.

4. The composition of claim 1 wherein the metal salt catalyst is a metal carboxylate salt.

5. The composition of claim 1 wherein the metal salt catalyst is selected from the group consisting of metal acetates, stearates, propionates, hexanoates, octanoates, benzoates, salicylates, cinnamates and combinations thereof.

6. The composition of claim 1 wherein the metal salt catalyst is selected from the group consisting of a cobalt, copper or ruthenium, acetate, stearate, propionate, hexanoate, octanoate, benzoate, salicylate or cinnamate, and combinations thereof.

7. The composition of claim 1 further comprising a base catalyst.

8. The composition of claim 1 wherein ethylene vinyl alcohol copolymer is retortable.

9. The composition of claim 1 further comprising a clay.

10. The composition of claim 1 further comprising a clay whose average platelet thickness is in the range of from about 1 nm to about 100 nm and whose average length and average width are each in the range of from about 50 nm to about 500 nm.

11. The polymer composition of claim 1 wherein the composition consists essentially of a blend of at least one ethylene vinyl alcohol copolymer, at least one oxidizable epoxy or anhydride functional polybutadiene, and at least one metal carboxylate salt catalyst.

12. The polymer composition of claim 1 wherein the composition consists essentially of a reaction product of at least one ethylene vinyl alcohol copolymer, at least one oxidizable epoxy or anhydride functional polybutadiene, and at least one metal carboxylate salt catalyst.

13. An oxygen barrier film comprising a layer of a polymer composition which consists essentially of:
    a) at least one ethylene vinyl alcohol copolymer;
    b) at least one oxidizable epoxy or anhydride functional polybutadiene; and
    c) at least one metal salt catalyst.

14. The oxygen barrier film of claim 13 which is oriented.

15. The oxygen barrier film of claim 13 further comprising a thermoplastic polymer layer on one or both sides of the polymer composition layer.

16. The oxygen barrier film of claim 13 wherein the polymer composition further comprises a clay.

17. A multilayer article which comprises:
    a) a polymer composition layer consisting essentially of at least one ethylene vinyl alcohol copolymer; at least one oxidizable epoxy or anhydride functional polybutadiene; and at least one metal salt catalyst; and
    b) a thermoplastic polymer layer on one or both sides of the polymer composition layer.

18. The multilayer article of claim 17 wherein the thermoplastic polymer layer comprises a polyolefin, polyester, or polycarbonate.

19. The multilayer article of claim 17 wherein the thermoplastic polymer layer comprises a polyethylene terephthalate.

20. The multilayer article of claim 17 wherein the thermoplastic polymer layer and polymer composition layer are attached to one another by coextrusion, lamination or coinjection.

21. The multilayer article of claim 17 wherein the polymer composition layer further comprises a clay.

22. A shaped article which comprises a polymer composition which consists essentially of:
    a) at least one ethylene vinyl alcohol copolymer;
    b) at least one oxidizable epoxy or anhydride functional polybutadiene; and
    c) at least one metal salt catalyst.

23. The shaped article of claim 22 wherein the polymer composition further comprises a clay.

24. The shaped article of claim 22 which is in the form of a bottle or container.

25. A process for producing a polymer composition which comprises:
    a) melting at least one ethylene vinyl alcohol copolymer;
    b) blending the molten copolymer with at least one oxidizable epoxy or anhydride functional polybutadiene and at least one metal salt catalyst to thereby form a mixture which consists essentially of the ethylene vinyl alcohol copolymer, epoxy or anhydride functional polybutadiene and metal salt catalyst; and c) cooling the mixture.

26. The process of claim 25 which comprises a clay preblended with the ethylene vinyl alcohol copolymer.

27. A process for producing an oxygen barrier film which comprises:
a) melting at least one ethylene vinyl alcohol copolymer;
b) blending the molten copolymer with at least one oxidizable epoxy or anhydride functional polybutadiene and at least one metal salt catalyst to thereby form a mixture which consists essentially of the ethylene vinyl alcohol copolymer, epoxy or anhydride functional polybutadiene and metal salt catalyst;
c) extruding, casting or blowing the mixture into a film; and
d) cooling the film.

28. The process of claim 27 wherein the film is subsequently oriented in at least one direction.

29. The process of claim 27 which comprises a clay preblended with the ethylene vinyl alcohol copolymer.

30. A process for producing an oxygen barrier polymer film which comprises:
a) melting a composition which consists essentially of at least one ethylene vinyl alcohol copolymer; at least one oxidizable epoxy or anhydride functional polybutadiene; and at least one metal salt catalyst;
b) extruding, casting or blowing the composition into a film; and
c) cooling the film.

31. A process for producing a multilayer article which comprises
a) melting at least one ethylene vinyl alcohol copolymer; at least one oxidizable epoxy or anhydride functional polybutadiene; and at least one metal salt catalyst to thereby form a mixture which consists essentially of the ethylene vinyl alcohol copolymer, epoxy or anhydride functional polybutadiene and metal salt catalyst;
b) separately melting a thermoplastic polymer composition;
c) coextruding, casting, blowing, thermoforming, blow molding or coinjecting the mixture and thermoplastic polymer composition into a multilayer article; and
d) cooling the article.

32. The process of claim 31 wherein the article is in the form of a film, a bottle or a container.

33. The process of claim 31 wherein the article is a film which is subsequently oriented in at least one direction.

34. The process of claim 31 wherein said copolymer is melted prior to blending with said oxidizable epoxy or anhydride functional polybutadiene.

35. The process of claim 31 wherein said copolymer and said oxidizable epoxy or anhydride functional polybutadiene are melted after blending.

36. The process of claim 31 which comprises a clay preblended with the ethylene vinyl alcohol copolymer.

37. A process for producing a multilayer article which comprises:
a) melting at least one ethylene vinyl alcohol copolymer; at least one oxidizable epoxy or anhydride functional polybutadiene; and at least one metal salt catalyst to thereby form a mixture which consists essentially of the ethylene vinyl alcohol copolymer, epoxy or anhydride functional polybutadiene and metal salt catalyst;
b) separately melting a thermoplastic polymer composition;
c) coinjecting molding the mixture and thermoplastic polymer composition into a multilayer preform;
d) reheating the perform; and
e) blow molding the perform into a multilayer article.

38. A multilayer article formed by the process of claim 37.

39. An oxygen-scavenging polymer composition which comprises:
a) at least one ethylene vinyl alcohol copolymer;
b) at least one oxidizable, anhydride functional polybutadiene; and
c) at least one metal salt catalyst.

40. The composition of claim 39 wherein the oxidizable, anhydride functional polybutadiene comprises particles which are substantially uniformly distributed in the polymer composition.

41. The composition of claim 39 wherein the oxidizable, anhydride functional polybutadiene comprises particles whose average particle size is in the range of from about 10 nm to about 5000 nm, and which particles are substantially uniformly distributed in the polymer composition.

42. The composition of claim 39 further comprising a base catalyst.

43. The composition of claim 39 further comprising a clay.

44. The composition of claim 39 wherein the composition comprises a blend of at least one ethylene vinyl alcohol copolymer, at least one oxidizable, anhydride functional polybutadiene and at least one metal carboxylate salt catalyst.

45. The composition of claim 39 wherein the composition comprises a reaction product of at least one ethylene vinyl alcohol copolymer, at least one oxidizable, anhydride functional polybutadiene and at least one metal carboxylate salt catalyst.

46. An oxygen barrier film comprising a layer of a polymer composition of claim 39.

47. A multilayer article which comprises the polymer composition of claim 39.

48. A shaped article which comprises the polymer composition of claim 39.

* * * * *